May 22, 1934. G. C. CRAIG 1,959,571
AIRLESS AUTO TIRE
Filed March 21, 1933
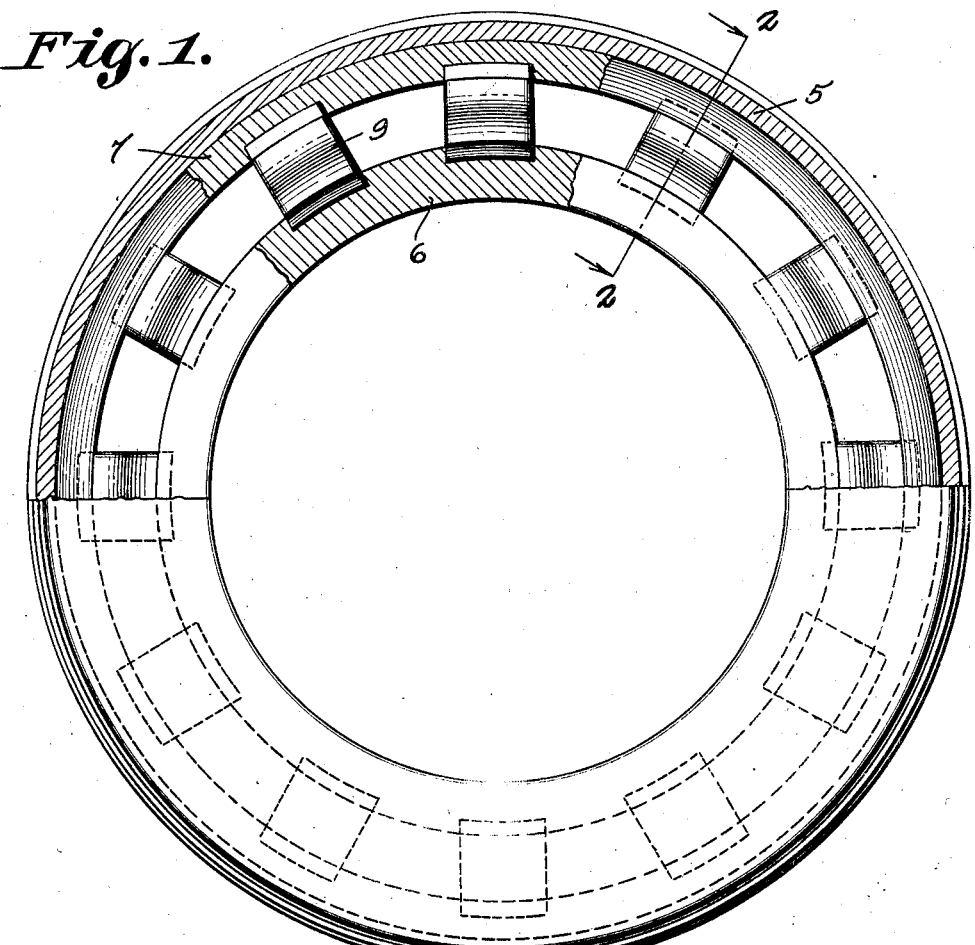
Fig. 1.
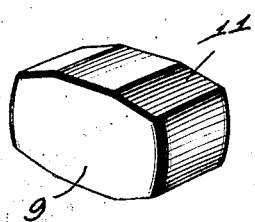
Fig. 3.
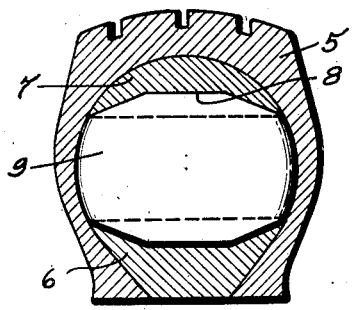
Fig. 2.
Fig. 4.
Inventor
George C. Craig Patented May 22, 1934

1,959,571

UNITED STATES PATENT OFFICE 1,959,571

AIRLESS AUTO TIRE

George C. Craig, Bloomington, Ill.

Application March 21, 1933, Serial No. 661,878

2 Claims. (Cl. 152—5)

My invention relates to improvements in cushion tires for vehicle wheels.

The primary object of the invention is to provide a tire composed of an outer casing and a cushion insert which will impart to the tire the desired resiliency without the use of air, thus rendering the tire puncture-proof.

A further object of the invention is to provide a tire of the above-mentioned character which is simple and durable in construction, reliable and efficient in use and inexpensive to manufacture.

Other objects and advantages of the invention will be apparent during the course of the following description.

In the accompanying drawing, forming a part of this specification and in which like numerals are employed to designate like parts throughout the same, Fig. 1 is a side elevation view of the tire, partly in longitudinal section, Fig. 2 is a cross section taken on line 2—2 of Fig. 1, Fig. 3 is a perspective view of one of the partitions for the insert, and, Fig. 4 is a fragmentary perspective view of one of the sections of the insert.

In the drawing, wherein for the purpose of illustration, I have shown a preferred embodiment of my invention, the numeral 5 denotes a conventional tire casing, of the type adapted to receive an inflatable inner tube.

Referring more particularly to my invention, I provide a cushion insert adapted to be substituted for the inner tube of the conventional tire, which will give the tire the desired resiliency and at the same time will be puncture-proof. The cushion insert consists of inner and outer rubber rings 6 and 7, concentrically disposed in spaced relation and of arcuate shape in cross section, with their flat sides disposed in confronting relation. The confronting sides of the rings are provided at uniformly spaced intervals with opposed recesses 8, to receive the solid rubber partitions 9, which resiliently support the rings in spaced relation. The ends of the recesses 8 are angularly disposed, as at 10, corresponding to the angularly disposed corners 11 of the partitions, whereby the partitions are held against side-wise movement when mounted between the rings. The partitions are secured in place by the resiliency of the rings 6 and 7. The cushion insert, as a whole, is adapted to conform in shape to the inner contour of the tire casing, so as to snugly fit within the casing.

In use, it will be seen that when the cushion insert is inserted in a tire casing, it will impart to the tire the desired resiliency, while at the same time the tire will be rendered puncture-proof.

It is to be understood that the form of my invention herewith shown and described is to be taken as a preferred example of the same and that certain changes in the shape, size and arrangement of the parts may be made without departing from the spirit of the invention or scope of the claims.

Having thus described my invention, I claim:—

1. A cushion tire comprising a tire casing, an insert for mounting in said tire casing composed of rubber inner and outer concentric rings having their outer faces conforming to the transverse contour of said tire casing, and solid rubber blocks disposed between the confronting faces of said rings at spaced intervals and extending transversely thereof beyond the edges of the rings into contact with the side walls of said casing, the upper and lower faces of said blocks being angularly shaped and fitting in correspondingly shaped recesses formed in the inner faces of said rings.

2. A cushion tire comprising a tire casing, an insert for mounting in said tire casing composed of rubber inner and outer concentric rings having their outer faces conforming to the transverse contour of said tire casing, the confronting faces of said rings being provided at spaced intervals with opposed transverse recesses, the depth of the recesses at their ends being gradually reduced and solid rubber partitions disposed between the confronting faces of said rings having their upper and lower faces of corresponding shape to the bottoms of said recesses and adapted to fit in said recesses.

GEORGE C. CRAIG.